July 19, 1949.  G. H. BERKHOLDER  2,476,400
FLOW CONTROLLING DEVICE
Filed July 12, 1943  3 Sheets-Sheet 1

Fig. 1.

Inventor
GEORGE H. BERKHOLDER
By
George H. Fisher
Attorney

July 19, 1949.  G. H. BERKHOLDER  2,476,400
FLOW CONTROLLING DEVICE

Filed July 12, 1943  3 Sheets-Sheet 3

Inventor
GEORGE H. BERKHOLDER

By
George H. Fisher
Attorney

Patented July 19, 1949

2,476,400

UNITED STATES PATENT OFFICE 2,476,400

FLOW CONTROLLING DEVICE

George H. Berkholder, Minneapolis, Minn., assignor to Minneapolis-Honeywell Regulator Company, Minneapolis, Minn., a corporation of Delaware Application July 12, 1943, Serial No. 494,277

21 Claims. (Cl. 137—139)

1

The present invention relates to the control of the flow of fluids and more particularly to such flow as applied to control means for governing the intermittent operation of fuel burning apparatus.

One of the principal objects of importance and advantage of the invention resides in the provision of means for operating a step opening valve whereby the valve may be quickly opened to a minimum open position and then slowly opened to a maximum open position.

Heretofore various types of step operated valves have been brought forth. However, these devices have not been altogether satisfactory or entirely efficient and dependable. One of the predominant faults in the former step opening valves seemed to lie in the fact that the original or opening step is governed by accessory or outside control means. In the present invention this fault has been overcome by providing means associated with the movable parts of the valve whereby movement of the parts cause the control means to function. Accordingly, it will be apparent that the extent of the initial opening step of the valve may be positively controlled. Additionally, the extent of the original step may be determined and fixed by the distance traveled by the movable parts of the valve.

Another object of the invention is the provision for operably associating positive step limiting means with the single movable wall of a pressure motor and the movable parts of a controlled supply valve which are joined for movement in unison with the movable wall.

A further object of importance and advantage of the improved device of the invention is the provision of means for closing the supply valve in a single continuous movement.

An additional object of advantage and importance resides in the provision of a chamber on one side of the movable wall of the pressure motor which is of relatively large size with respect to the other side so that the time required to open the valve will be relatively long.

Still another object of the invention resides in the provision of means for controlling the flow of fluid into the lower pressure chamber of the motor to produce step opening of a valve associated with the diaphragm of the motor, the steps of said opening operation being at accelerated and reduced speeds respectively, and for closing the valve at a constant rate of speed.

Another and still further object of importance of the improved device of the invention resides in the provision of means for positioning positive stop means in operable association with the valve stem of a controlled supply valve to move therewith and to limit the original opening movement of the valve stem.

A still further object of advantage and importance is the provision of means for mounting a pair of valves on the diaphragm of a pressure motor for reciprocal movement whereby one valve opens a supply line and the other valve controls and limits the opening movement of the first valve.

Other objects of importance and advantage, some of which are hereinafter specifically set forth, will become apparent as the following detailed description progresses, reference being had to the accompanying drawings, wherein—

Figure 1:
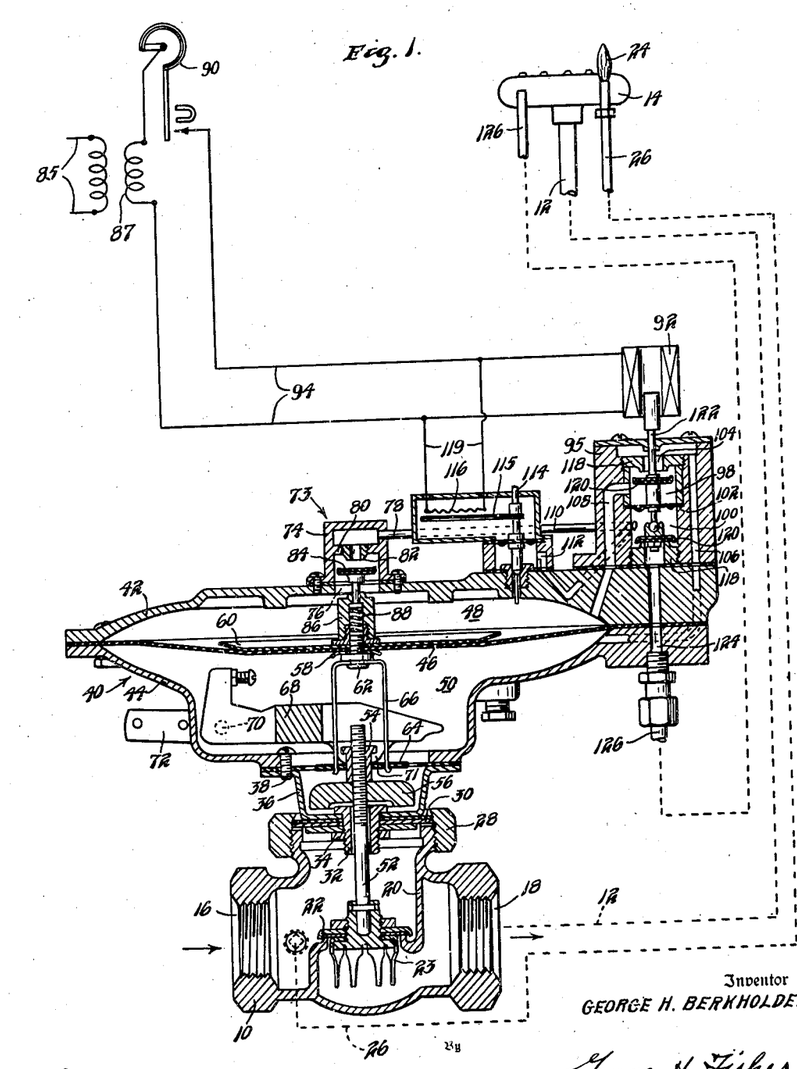
Fig. 1 is a sectional view of a pressure motor and valve assembly and control, which embodies the invention, diagrammatically associated with a room thermostat and a burner.

Referring to the embodiment of the invention shown in Fig. 1, the reference numeral 10 indicates generally a supply valve. The supply valve 10 is connected by means of a conduit 12 with a burner 14. The supply valve 10 is provided with an inlet 16 and an outlet 18.

Formed in the supply valve 10 intermediate the inlet 16 and the outlet 18 is an apertured dividing wall 20. A valve disc assembly 22 functions as a removable closure for the aperture in the dividing wall 20 to permit or prevent the passage of fluid therethrough. The valve disc assembly includes a configurated skirt 23 which acts to throttle the flow through the valve when the valve disc assembly is in a partially open position. Extending from the inlet side of the supply valve 10 to the pilot light 24 is a conduit 26. Opening or closing the aperture in the dividing wall 20 does not interfere with the functioning of the conduit 26.

Removably secured to the supply valve 10 by means of a clamp nut 28 is an apertured closure member 30. Secured to the closure member 30 by means of a securing thimble 32 and nut 34 is a cup-shaped mounting bracket 36 constituting the bottom section of a pressure motor 40. The mounting bracket 36 and the closure member 30 are centrally apertured to receive the securing thimble 32.

The main body portion of the pressure motor 40 comprises an upper member 42 and a lower member 44 which are each substantially concavo-convex in section as is clearly shown in the drawing. Interposed between the upper member 42 and lower member 44 of the pressure motor 40 is a flexible diaphragm 46. The diaphragm 46 divides the interior portion of the motor 40 into an upper pressure chamber 48 and a lower pressure chamber 50. The pressure chamber 50, the mounting bracket 36 and the inlet side 16 of the supply valve 10 are joined to form a fluid tight passageway.

Joined to and extending upwardly from the disc assembly 22, through the thimble 32 and into the lower pressure chamber 50 is a valve stem 52. The upper portion of the valve stem is threaded, as is clearly shown in Fig. 1 of the drawings, to receive a shouldered adjustment nut 54 and a weight member 56. It is to be noted that a space is provided between the valve stem 52 and the interior surface of the thimble 32 to permit the passage of fluid therethrough.

A pair of reinforcing washers 58 and 60 are disposed on opposed sides of the central portion of the diaphragm 46. The washers 58 and 60 are preferably secured in position by means of a screw threaded bolt and nut assembly 62. Depending downwardly from the assembly 62 and having the lower end thereof operably associated by means of a washer 64 with the adjustment nut 54 is a stirrup member 66. The stirrup functions as guide for a bifurcated arm 68 and also as a connecting link between the diaphragm 46 and the valve stem 52.

Journaled in the wall of the lower member 44 of the pressure motor 40 and extending across the lower chamber 50 is a shaft 70. Secured to the shaft 70 and rockable therewith is the arm 68 having the bifurcated end portion. The bifurcated end of the arm 68 is disposed to straddle the stirrup 66 and is provided with ears 71 bearing against the washer 64. Secured to the outer end of shaft 70 is an extension arm member 72. Rockable movement originating in the arm 68 is imparted through the shaft 70 to the arm 72.

A diaphragm actuated cutoff valve 73 including a body 74, which constitutes the uppermost portion of the pressure motor housing and has an inlet 76 and an outlet passageway 78, is positioned on the upper member 42 of the pressure motor 40. An apertured dividing wall 80, having a valve seat 82, is formed intermediate the inlet 76 and the outlet 78. Positioned on the bolt and nut assembly 62 and extending upwardly thereabove is a cylindrical element 86 for guiding a valve disc assembly 84. A spring member 88 provides means for a yieldable engagement between the disc 84 and the seat 82. The spring member 88 also permits a limited downward movement of the diaphragm without moving the disc 84 from the seat 82. Upward movement of the diaphragm from the position shown in Fig. 1 moves the disc 84 toward the seat 82.

An electro-magnetic pilot valve control is provided for bleeding the passageways extending from the pressure chambers 48 and 50 and from the body 74. The electro-magnetic control comprises leads 85 from a source of electrical energy, a transformer 87, a room thermostat 90, a solenoid 92 and a circuit 94 extending from the transformer 87 through the thermostat 90 to the solenoid 92 and returning to the transformer 87. The control valve includes a housing 95 preferably positioned on the upper member 42 of the pressure motor 40 as shown in Fig. 1 of the drawings. The housing 95 is provided with a centrally located recess which is divided into upper and lower compartments 98 and 100 by a flexible diaphragm 102.

Extending from the upper compartment 98 through a valved orifice 104 to the lower pressure chamber 50 is a passageway 106. A passageway 108 extends from the upper compartment 98 into the upper pressure chamber 48. When the device is inactive the entire passageway between the lower pressure chamber 50 and the upper pressure chamber 48 is open. Thus, pressure on each side of the flexible diaphragm is substantially equal.

Extending from the interior of the body 74 to lower compartment 100 is a conduit 110. A passageway 112 controlled by a heat actuated control valve 114 extends from the upper pressure chamber 48 into the lower compartment 100 in parallel with valve 73 and conduit 110. The warp control valve 114 is positioned by a bimetallic element 115 having a heating element 116 associated with it. The valve 114 is normally closed and is opened when the heating element 116 is energized and gives off sufficient heat to flex the bimetallic element 115. Energy is supplied through an extension 119 of circuit 94.

Positioned at each end of the recess within the pilot valve casing 95 is an apertured closure member 118. Each closure member is provided with a seating surface which is adapted to engage a complementary disc assembly 120 to provide a fluid-tight valve. Operably joined to each disc 120 and also to the diaphragm 102 is a valve stem 122. The upper valve opens and closes the passageway between the upper pressure chamber 48 and lower pressure chamber 50. The lower valve functions to open and close the bleeder passageway 124 leading to the conduit 126 which conveys discharge from the passageways 110 and 112 to the burner 14. Except for the valved bleeding passageway the pressure chambers 48 and 50 are sealed from atmosphere.

Fig. 1 of the drawing shows an embodiment of the improved device of this invention in closed position. The supply valve is closed and supply and operating fluid may pass through the conduit 26 to the pilot light. Fluid can also pass upwardly through the intake side of the valve 10 through the thimble 32 into the lower pressure chamber 50. The passageways 106 and 108 are open to permit fluid to pass into the upper pressure chamber 48. The pressure on opposed sides of the diaphragm 46 is substantially equal. The open passageway through the conduit 110 terminating in the recess of the housing 95 permits the fluid to enter the lower compartment 100. The closed lower valve 120 and the diaphragm 102 prevent further travel of the fluid.

Upon a call for heat by the room thermostat 90, the solenoid 92 is activated thus raising the valve stem 122 moving the upper disc 120 to close the orifice 104 and at the same time raise the lower disc 120 to open the passageway 124. Pressure in the upper chamber 48 is reduced by passage of the fluid through the inlet 76 and the outlet 78, thence through the passageway 124 and the conduit 126 to the burner 14. As the pressure in the upper chamber 48 is reduced, the diaphragm 46 and members associated therewith quickly move upwardly. The link connection, comprising the stirrup 66, the washer 64 and the adjustment nut 54, permits the diaphragm 46 to first raise the arm 68 and then the valve stem 52 and the disc assembly 22. The amount of movement of arm 68 permitted before valve stem 52 is raised depends upon the adjustment of nut 54 which determines the amount of movement of washer 64 before it engages the flange of nut 54. The supply valve 10 continues to open until the disc 84 engages the seat 82 and blocks further bleeding of the pressure chamber 48.

Coincident with the activation of the solenoid 92 the heating element 116 is energized. An appreciable period of time occurs, however, before bimetallic element 115 is appreciably heated. During this time, the diaphragm and valve assembly remain in a partially open position. As heat from the element 116 flexes the bimetallic member 115, the valve 114 gradually opens permitting further bleeding of the upper pressure chamber 48. Upon further bleeding of the chamber 48, the diaphragm 46 and associated parts continue to move upwardly until the second step in the opening movement is completed. Thus, the valve disc assembly is first moved to a partially open position and then, after an appreciable period of time is moved to full open position.

When the room thermostat 90 is satisfied, the circuit 94 is opened and the solenoid 92 and the heating element 116 are deenergized. The lower disc 120 engages its seat and the upper disc 120 is disengaged opening the passageway between the upper and lower pressure chambers 48 and 50, respectively.

Upon the closing of the lower disc 120 and the restoration of substantially equalized pressure in the chambers 48 and 50, the diaphragm actuated assembly including the arm 68 move downwardly opening the cutoff valve 73 and closing the supply valve 10. The counter weight 56 assists in the downward movement of the diaphragm 46. Closing is accomplished in a single continuous movement. As the bimetallic element 115 cools the valve 114 closes and the cycle of operation is completed.

Figures 2, 3:
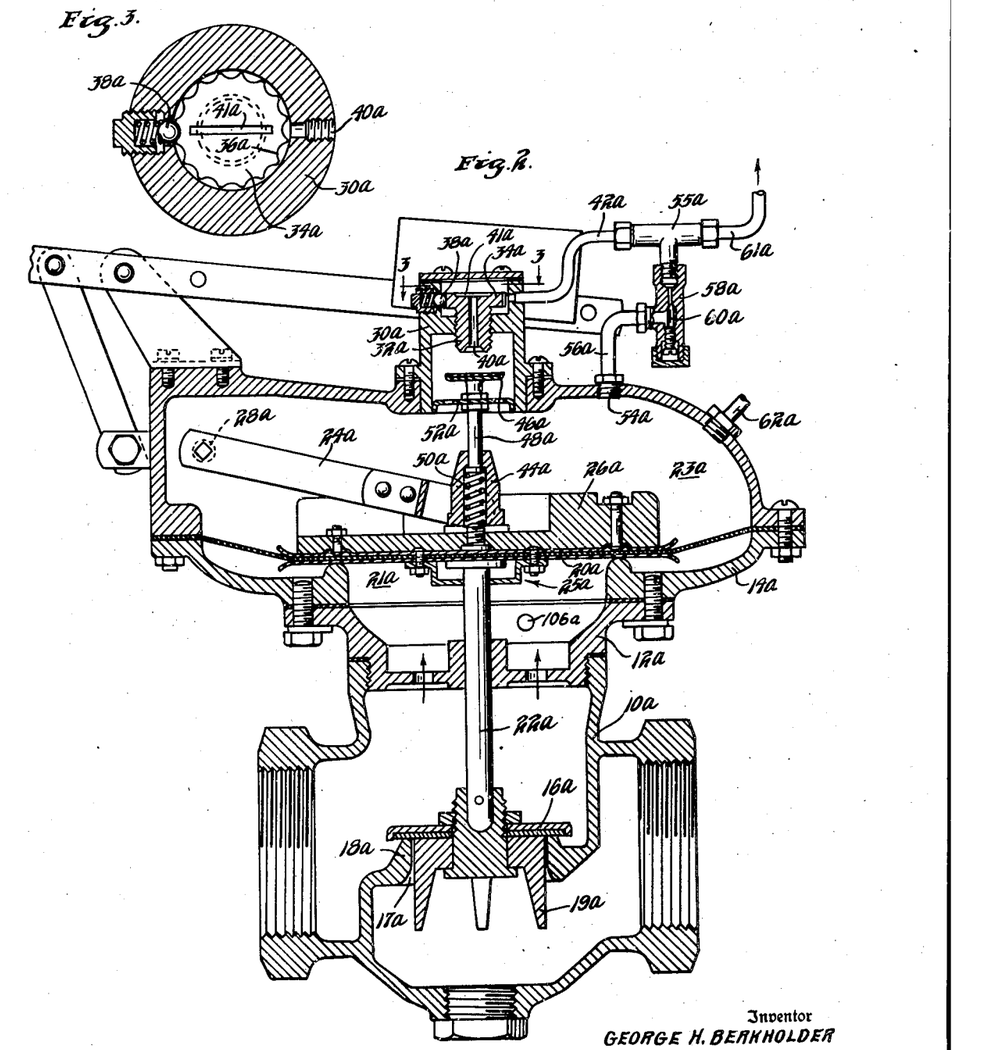
Fig. 2 is a sectional view of a slightly modified form of the invention.
Fig. 3 is a section taken on line 3—3 of Fig. 2.

Modification of Figures 2 and 3

The slightly modified form of the invention shown in Figs. 2 and 3 is similar to the construction shown in Fig. 1. The portion of the structure shown includes a supply valve 10a and a pressure motor 14a. The assembly also includes a vertically movable disc unit 16a which is adapted to move into and out of engagement with a valve seat 18a. Extending downwardly from the valve disc 16a into the supply passageway 17a is a valve guide 19a. The guide 19a is designed to substantially fill the passageway 17a to limit the flow of fluid therethrough until the valve disc 16a has been raised a considerable distance from its closed position.

Secured to the disc unit 16a and extending upwardly through the bracket 12a and having its upper end connected through a lost motion connection 25a with the diaphragm 20a of the pressure motor 14a is a valve stem 22a. The diaphragm 20a divides the interior of the pressure motor into a lower compartment 21a and an upper compartment 23a. The capacity of the upper compartment 23a is normally greater than the lower compartment 21a. Consequently, a relatively large volume of fluid must be expelled from the upper compartment before the valved passageway 17a is fully opened.

Positioned on the upper surface of the diaphragm 20a and having portions thereof adapted to engage and operate a damper arm 24a is a counterweight 26a. The damper arm 24a is mounted on a shaft 28a for rockable operation.

Secured to the upper portion of the pressure motor 14a and in open communication with the interior thereof is a valve housing 30a. In the preferred embodiment of the invention a valve seat 32a is adjustably secured in the valve housing 30a as is best shown in Fig. 2. The upper portion of the valve seat member 32a is flanged as is indicated by the reference numeral 34a and the peripheral edge of the flanged portion is kerfed at 36a to receive a spring actuated restraining ball 38a. A passageway 40a extends through the valve seat 34a into and through the upper portion of the housing 30a. A conduit 42a provides a continuation of the passageway. The upper face of the valve seat member 32a is provided with a screw driver slot 41a to enable the valve seat member to be adjusted readily. Obviously, by removing the cover plate of the valve housing and inserting a screw driver in slot 41a, the vertical position of the valve seat member 32a can be adjusted.

Positioned on the central portion of the upper surface of the counter weight 26a is a valve stem supporting member 44a. A valve disc 46a for closing the passageway 40a is mounted on the upper end of a valve stem 48a. The lower end of the valve stem 48a is in telescoping engagement with the valve stem supporting member 44a. Yieldable engagement between the valve disc 46a and the valve seat 32a is provided by the compression spring member 50a. An apertured guide member 52a rigidly fixed to the valve stem 48a and in slidable engagement with the interior of the valve housing 30a prevents misalignment of the valve disc 46a and the valve seat 32a. This valve provides a control for adjustably limiting the initial opening of the valve 16a.

Formed in the upper portion of the pressure motor 14a is an orifice 54a into which a conduit 56a is secured to provide a bleeding passageway. The conduit 56a is joined to the conduit 42a by a T-fitting 55a and by a T-fitting 58a which houses a manually adjustable passageway restricting member 60a. The member 60a may be adjusted to control the flow of fluid escaping through the conduit 56a.

The right hand end of fitting 55a is connected to a conduit 61a which is adapted to be connected to a pilot valve means similar to that shown in Fig. 1. The pipe 61a is connected to the chamber 100 of the pilot valve means. A conduit 62a connects the upper chamber 23a with the chamber 98 of the pilot valve means. Any suitable means, such as a conduit (not shown), is employed for connecting passage 106 of the pilot valve means with gas at inlet pressure at opening 106A. Upon a call for heat the bleeding passageways through the conduits 42a and 56a are opened. As the pressure in the upper chamber of the motor 14a is reduced, the diaphragm 20a and other parts movable therewith are by pressure in the lower chamber forced upwardly. The upward movement continues at a given rate of speed until the valve disc 46a closes the passageway 40a. The diaphragm position at this time is dependent upon the adjustment of valve seat 32a. The further upward movement of the diaphragm and supply valve 16a is at a reduced rate of speed determined by the rate at which gas bleeds through restriction 60a. Upward movement is gradually arrested by resistance of the compression spring 50a. The valve is closed in a single continuous downward movement.

Due to the large capacity of the upper chamber 23a with respect to the lower chamber 21a, the speed of the opening movement of the valve is further reduced. This arises from the necessity of forcing a relatively large volume of gas out first through the passage 42a and then through the restricted passage 56a.

It will be apparent that the devices shown in Figs. 1, 2, and 3 open in two progressive steps. The initial step being at a greater rate of speed than the later step. Also that the speed of each step is governed by controlling the bleeding of one side of the pressure motor. Additionally, in the device shown in Figs. 2 and 3, the length of the initial step may be varied to meet different conditions. Moreover, in this latter device, the time required for each step is relatively large due to the large capacity of the upper diaphragm chamber.

Figures 4, 5:
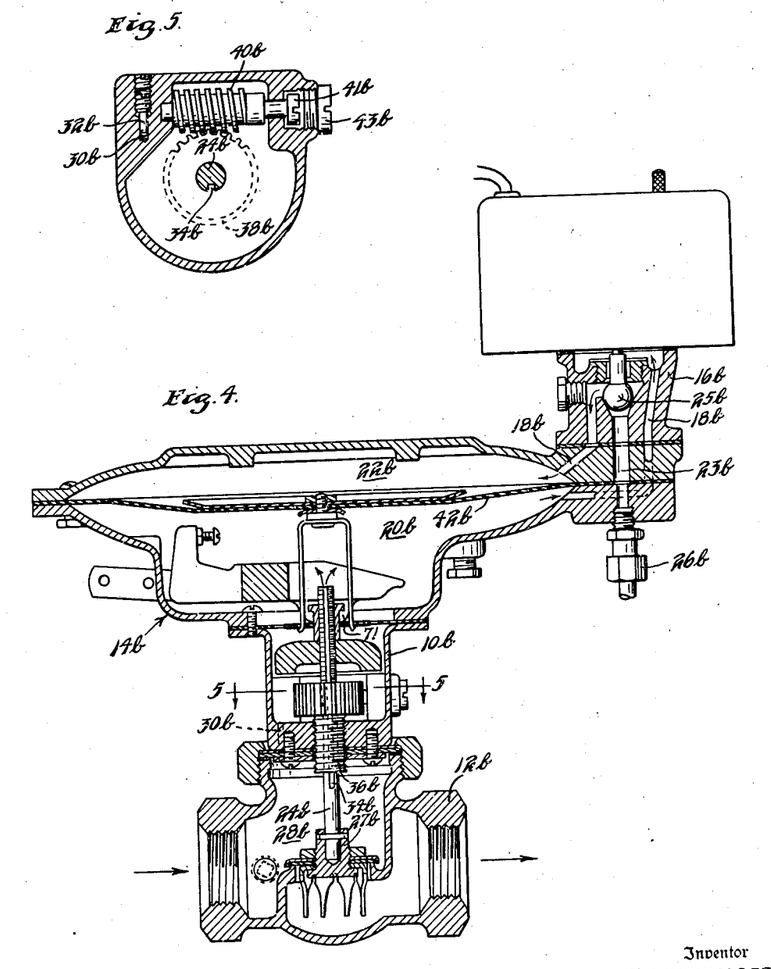
Fig. 4 is a sectional view of a further modified form of the invention.
Fig. 5 is a section taken on line 5—5 of Fig. 4.

Modification of Figures 4 and 5

A modified embodiment of the invention is shown in Figs. 4 and 5. In this modification, a mounting bracket 10b positioned on a supply valve 12b, supports the main body portion 14b of a pressure motor and a pilot valve control mechanism 16b. A valved passageway 18b extends from the lower pressure chamber 20b to the upper pressure chamber 22b. A valved passageway 23b provides means for bleeding the upper pressure chamber 22b through the conduit 26b.

A pilot valve 25b controls both passageways 18b and 23b. When the valve 25b is in the position shown, passage 18b is open. When it is raised, passageway 23b is open to the upper chamber 22b.

Extending upwardly from the intake chamber 28b is a restricted passageway 30b. The passageway 30b is disposed to convey fluid from the intake chamber 28b of the valve 12b into the interior of the mounting bracket 10b and thence into the pressure chamber 20b. Positioned in the bracket 10b and adapted to be moved into and out of the passageway 30b is an adjustment member 32b. The adjustment member 32b is adapted to be manually set to restrict and thus control the flow of fluid through the passageway 30b.

Positioned within the valve 12b and extending upwardly through the mounting bracket 10b and into the lower pressure chamber 20b is a valve stem 24b to which is secured a valve disc assembly 27b. Formed in the intermediate portion of the valve stem 24b and extending longitudinally thereof to the upper end is a passageway 34b. The passageway 34b, when the valve is in closed position, extends from the intake chamber 28b into the lower pressure chamber 20b.

Positioned on the intermediate portion of the valve stem 24b, which is longitudinally movable therein, and in screw threaded association with the base of the mounting bracket 10b is an adjustment and guide sleeve 36b. The upper portion of the sleeve 36b is provided with a pinion 38b and worm 40b for manual adjustment of sleeve 36b. The worm 40b is provided with a slotted head 41b disposed in a compartment normally closed by a screw threaded plug 43b. Upon the plug 43b being removed, the worm 40b may be rotated by means of a screw driver inserted in the slot of head 41b. Rotation of worm 40b in turn adjusts the elevation of sleeve 36b to vary the distance between the lower end of sleeve 36b and the lower end of the passageway 34b. The amount of this distance determines the extent of the initial step in the opening of the valve.

In the position shown, the passage 18b is open so that the chambers 20b and 22b are in communication with each other. Upon the valve 25b being moved upwardly by energization of the electromagnetic actuating mechanism for it, communication is established between passages 18b and 23b so that gas may bleed from the upper chamber 22b to reduce the pressure therein. This permits the diaphragm 42b to move upwardly first raising the valve disc assembly 27b. When the valve disc assembly is in a desired minimum open position, the lower end of the passageway 34b will slide past the lower end of the sleeve 24b. The effect of this is to close the relatively free passage of gas into the lower chamber through passageway 34b and compel all of the gas entering the lower chamber 20b to pass through the restricted passageway 30b. As a result, the further movement of the diaphragm 42b is relatively slow. The time required for the valve assembly to move from the intermediate position at which passageway 34b is closed and a full open position is determined by the setting of adjustment screw 32b.

It is to be noted that the upward movement of the diaphragm is not dependent upon gas flow through passage 30b until the valve is in its minimum open position. Thus, even if passageway 30b should become completely closed, the valve will still move to the minimum open position in which limited burner operation is possible.

While the upper chamber 22b is shown as being relatively small in volume, it is to be understood that this chamber can be formed so that it is relatively large with respect to the lower chamber, as with the species of Figs. 2 and 3. When this is done, the time required for the valve to be opened is still further increased.

When the electromagnetic operator for the pilot valve 25b is deenergized, communication between passageways 18b and 23b is interrupted and passageway 18b is once again reopened. This results in gas flowing from the lower chamber 20b into the upper chamber 22b and equalizing the pressure in the two chambers. The result of this is that the valve moves relatively quickly to closed position.

It will be apparent to those skilled in the art to which the improved device of this invention apertains that changes and alterations from the three modifications here shown may be made without departing from the spirit or scope of the invention. Accordingly, the patent granted hereon is not to be limited to the precise embodiments here disclosed or in any other manner except as is necessitated by the terminology of the appended claims when given the range of equivalents to which they may be entitled.

I claim as my invention:

1. In a fluid operated step opening valve mechanism, a valve housing having an inlet and an outlet side disposed in a supply line, a main valve and seat interposed between said inlet and outlet sides, a pressure motor a flexible wall positioned within said motor, said flexible wall providing an upper and a lower pressure chamber within said motor, a valved passageway joining the interiors of said pressure chambers, means for closing said passageway to prevent the flow of fluid therethrough, means for connecting said main valve for vertical movement in unison with said flexible wall, a first passage connecting said inlet side and said pressure motor, valve means operated by said movement for terminating flow through said passage and thereby limiting the initial opening step of said movable parts, said valve means being formed by an adjustable end of said passage and a member carried by said main valve, and a second passage providing fluid control means for controlling the speed of further opening movement of said wall and said main valve.

2. In a valve opening mechanism, a valve housing having an inlet and an outlet side, a valve and valve seat positioned between said inlet and outlet sides, a fluid pressure motor in operable association with said valve housing, a diaphragm positioned within said pressure motor and connected to said valve, and means for controlling the pressure differential on opposed sides of the diaphragm to induce a quick partial opening of the valve and a further full opening thereof at a different rate of speed, said means including a longitudinally adjustable sleeve cooperating with a portion of said valve to provide a valve passage connecting said inlet with said fluid pressure motor.

3. In a fluid supply valve control, a valve housing having inlet and outlet sides, a supply valve and seat positioned intermediate said inlet and outlet sides, a fluid pressure motor comprising an upper and a lower pressure chamber having a diaphragm therebetween, a valve stem projecting upwardly from said valve and being operably joined to said diaphragm, a groove passageway extending from the intermediate portion of said stem longitudinally to the upper end thereof, a flanged sleeve through which said valve stem passes, said sleeve being longitudinally adjustable in respect to said valve stem, the lower end of said sleeve being at a point above the lower end of said groove when the supply valve is in closed position, upward movement of the valve stem into the sleeve closing the groove passageway at a point determined by the adjustment of said sleeve, a restrictably adjustable passageway providing a second opening between said valve and said pressure motor, said passageways providing means for controlling the flow of fluid into the pressure motor, and valve operating means for controlling the flow of fluid from said pressure motor.

4. In combination, a pressure motor having a lower and an upper pressure chamber therein, a movable wall disposed between said chambers, a valve housing secured to said motor, said housing having an inlet and an outlet and a valve seat therebetween, a valve positioned in said housing, a valve stem extending from said valve into said lower pressure chamber, a connection joining said valve stem to said movable wall, an adjustable member through which said valve stem slidably operates, a passageway extending from said valve housing inlet along said valve stem into said lower pressure chamber, said passageway being open when the valve is closed and cooperating with said member to close as the valve stem slides through said adjustable member to an intermediate open position of said valve thus providing means for quickly moving said valve through its initial opening movement and checking said movement when said valve has reached said intermediate position, and an adjustably restrictable passageway providing means for slowly continuing the opening movement of said valve by slowly varying the pressure in said lower chamber.

5. In a fuel valve having an inlet and an outlet with a valve seat therebetween, a main fuel valve, a pressure motor having two chambers separated by a movable wall operably connected to said main valve, means for supplying operating pressure to said pressure motor for operating said main valve between open and closed positions with respect to said seat, said means including a two position valve operable in one position to establish communication between said two chambers whereby the pressures therein are equalized and said main fuel valve is moved to closed position and operable in a second position to prevent communication between said two chambers and to bleed one of said chambers whereby the pressures therein may be unbalanced to cause operation of said pressure motor to open said fuel valve, and means for controlling the unbalancing of the pressures in said chambers to cause said fuel valve to move rapidly from closed to a partly open position and to move slowly from said partly open position to full open position.

6. In a fluid operated step opening fuel valve having an inlet and an outlet with a valve seat therebetween, a pressure motor, a fuel valve operably connected to said motor, means for supplying fluid under pressure to said motor, means for controlling the operation of said motor to cause said fuel valve to open with respect to said seat in a plurality of steps wherein the initial step is at a more rapid rate than the succeeding step, said means including valve means having a seat concentric with the axis of the fuel valve and actuated when said fuel valve is moved from closed to a partially opened position with respect to said first mentioned seat to reduce the rate of opening movement of said fuel valve and means for controlling the further opening of said fuel valve after the initial step has been completed.

7. In a fuel supply valve control having an inlet and an outlet with a valve seat therebetween, a pressure motor, a fuel valve operably associated with said motor and said valve seat, means for supplying fuel to said motor, means for controlling the operation of said motor to cause said fuel valve to open in a plurality of steps wherein said fuel valve moves from closed to a partially open position at a rapid rate and from said partially open to full open position at a slower rate, said means including a pair of normally open passageways extending from said inlet and entering said pressure motor, one of said passageways having a valve seat concentric with the axis of the fuel valve and means for cutting off flow through said valve seat when said fuel valve is moved to said partially open position.

8. In a fuel valve mechanism, a fluid actuated pressure motor having a movable wall therein, a passage through said fuel valve mechanism, a valve seat positioned in said passage, a fuel valve connected to said movable wall and operable to move into and out of engagement with said valve seat upon movement of said wall, means for controlling the movement of said wall to cause said valve to move from closed to full open position in a plurality of steps wherein the initial step from closed to partially open position is at a rapid rate and the succeeding step from partially open to full open position is at a slower rate, and means selectively operable to balance the pressures on opposed sides of said movable wall to cause said fuel valve to move from open to closed position or to unbalance the pressures to open the valve independently of the means for controlling the step opening operation of the fuel valve or to unbalance the pressures to permit said fuel valve to open under the control of said step opening control means.

9. In combination, a pressure motor having a movable wall, a valve seat, a fuel valve cooperable with said valve seat, operable connections between said pressure motor and said fuel valve, a first passage extending from one side of said movable wall to the other side thereof, a second passage between said motor and the inlet side of said valve seat, two position valve means operable to control fuel flow through said first passage to cause the pressures on opposed sides of said movable wall to be unbalanced thereby initiating opening movement, means for controlling the operation of said pressure motor to open said fuel valve in a plurality of steps wherein a first step moves said fuel valve from closed position to a partially open position at a rapid rate and a second step moves said fuel valve from said partially open to full open position at a slower rate, said means including a normally open valve having a seat member housed at least partially within the pressure motor and actuated to closed position concurrently with the actuation of said fuel valve to an intermediate position and said two position valve being operable to balance the pressures on opposed sides of said movable wall independently of said control means thereby causing said fuel valve to close.

10. In combination, a valve body having an inlet and an outlet and a valve seat therebetween, a pressure motor having a movable wall, a fuel valve cooperable with said valve seat, operable connections between said pressure motor and said fuel valve, a first passage extending from one side of said movable wall to the other side thereof, a second passage between said inlet and said motor, two position valve means operable to control fuel flow through said first passage to cause the pressures on opposed sides of said movable wall to be unbalanced thereby initiating opening movement, means for controlling the operation of said pressure motor to open said fuel valve in a plurality of steps wherein a first step moves said fuel valve from closed position to a partially open position at a rapid rate and a second step moves said fuel valve from said partially open to full open position at a slower rate, said means including a normally open valve having a seat concentric with the axis of the fuel valve and actuated to closed position concurrently with the actuation of said fuel valve to an intermediate position, and said two position valve being operable to balance the pressures on opposed sides of said movable wall independently of said means thereby causing said fuel valve to close.

11. In a pressure operated fuel valve, in combination, a valve body having an inlet and an outlet and a valve seat therebetween a main fuel valve, a pressure motor connected thereto for opening and closing the same with respect to said valve seat, said pressure motor including two pressure chambers divided by a movable wall, means including two position control valve a passageway between said inlet and said motor means for selectively varying the pressure within the chambers of said pressure motor to open and close said main valve, and means including additional valve means having a seat housed within the pressure motor and concentric with the axis of the main valve and actuated when said main valve is moved from closed to a partially open position to control the pressure in said pressure motor thereafter to reduce the speed of opening movement of said main valve, said two position valve being operable independently of said additional valve means to control the pressure within both of said chambers to cause closing of said fuel valve.

12. In a pressure operated fuel valve having an inlet and an outlet, in combination, a valve seat between said inlet and outlet, a main fuel valve biased against said seat, a pressure motor including a movable wall connected to said main valve for opening and closing the same, a two position control valve, in communication with the inlet side of said main valve, a passage extending between opposite sides of said movable wall and arranged to equalize the pressures on both sides of said movable wall when said control valve means is in its first position to cause closing of said main valve, bleed passageways to unequalize the pressures on opposite sides of said movable wall to open the main valve when said control valve means is in its second position, and additional means including a further valve in the pressure motor which when closed cooperates with said passageways and said control valve means when in its second position to reduce the rate of relative pressure change on the opposite sides of said movable wall to reduce the speed of movement of said movable wall in valve opening direction, and means for closing said additional valve when said main valve has moved to a partially open position.

13. In a fluid operated step opening fuel valve mechanism for operating a valve with respect to a valve seat, a valve seat, a fuel valve, a pressure motor in operable association with said valve, means for supplying fluid under pressure to said motor, means including a two position control valve for selectively varying the pressure in said motor to cause opening and closing of said fuel valve, and means including additional valve with respect to said seat means within the pressure motor and operable to cause said fuel valve to move from closed to a partially open position at a relatively rapid rate and functioning to restrict movement of said fuel valve from said partially open position to full open position to a relatively slow rate, said two position control valve being operable to close said fuel valve independently of said additional valve means.

14. In a pressure operated fuel valve having an inlet and an outlet, in combination, a valve seat, a main fuel valve cooperable with said valve seat, a pressure motor connected to said valve for opening and closing the same, a passageway between said motor and said inlet, means including two position control valve means for selectively varying the pressure on said pressure motor to open and close said main valve, with respect to said valve seat and means including additional valve means in the pressure motor and actuated when said main valve is moved from closed to a partially open position to control the pressure on said pressure motor thereafter to reduce the speed of opening movement of said main valve.

15. In a fuel valve opening and closing mechanism, a main fuel valve, a pressure motor in operable association with said fuel valve, means for controlling the pressure motor to open the fuel valve in a plurality of steps, said means including a valve having a seat member concentric with the axis of the fuel valve and at least partially within the pressure motor and operable upon movement of the fuel valve to an intermediate minimum flow position, to cause further opening movement of said fuel valve to be at a slower rate, and a control valve for balancing and unbalancing the pressures in the pressure motor independently of said means.

16. In a fluid supply valve control, a main valve having an inlet and an outlet, a pressure motor operably connected with said valve for moving said valve from a closed position through a partially open position to a full open position, said motor including first and second pressure chambers, said main valve being closed when the pressure in one chamber equals the pressure in the other chamber and being open when the first chamber is at a lower pressure than the second chamber, said pressure chambers being separated by a diaphragm, a first passage extending from one pressure chamber to the other, a second passage extending from said inlet to said second chamber, an electromagnetically controlled valve interposed in said first passage for controlling the flow of fluid therethrough, a pair of bleeding passageways extending from said first chamber through said electromagnetically controlled valve to atmosphere, normally open valve operably connected to said diaphragm for controlling the flow of fluid through one of said passageways to check the opening movement of said main valve when it has moved to its partially open position, and a power operated valve controlling the other of said passageways for controlling the bleeding of fluid from said first chamber to control the further opening movement of said supply valve.

17. In combination, a supply valve having an inlet and an outlet, a pressure motor having a movable wall operably connected with said supply valve for moving said valve from a closed position through a partially open position to a full open position, said pressure motor comprising a pressure chamber on each side of said movable wall, a first passage between said inlet and one of said chambers, a second passage between said chambers, valved passageways for bleeding the other of said pressure chambers to control the pressure differential on opposite sides of the movable wall, one of said valved passageways being controlled by a normally open valve actuated by said movable wall to shut off bleeding therethrough when the said supply valve has reached its partially open position to check the opening movement of said supply valve, the other valved passageway being controlled by a power operated valve to control the opening movement of said supply valve from its partially open position to its full open position, and means for causing said movable wall to close the supply valve in a single downward step and to permit said supply valve to open under the control of said valved passageways, said means comprising a control valve for selectively closing said valved passageways and opening said second passage or closing said second passage and opening said valved passageways.

18. In a fluid operated step opening valve mechanism, a valve housing having an inlet and an outlet side, a supply valve and a valve seat positioned between said inlet and outlet sides, a pressure motor in open communication with the inlet side of said housing, a diaphragm positioned within said motor, said diaphragm being disposed to divide the interior of said motor into an upper and a lower pressure chamber, said supply valve being operably connected to said diaphragm for movement thereby from a closed position through a partially open position to a full open position, means for equalizing the pressure in both pressure chambers to move the valve to its closed position, a discharge passageway extending from the upper pressure chamber, an adjustable valve seat positioned within said passageway, a control valve joined to said diaphragm and movable therewith for seating engagement with said adjustable valve seat when said supply valve has moved to its partially open position, compression spring means interposed between said control valve and said diaphragm to permit continued upward movement of the diaphragm and supply valve after the seating of the control valve has checked the opening movement of said supply valve, a second discharge passageway extending from said upper chamber for controlling the continued opening movement of said supply valve, and a valve operated by said equalizing means for opening and closing said passageways.

19. In a fluid operated step opening valve mechanism, a valve housing having an inlet and an outlet and a valve seat therebetween, a pressure motor on said valve housing, a diaphragm positioned within said motor, said diaphragm being disposed to separate the interior of said motor into first and second pressure chambers, a passage extending from said inlet to said second chamber, a passage extending between said pressure chambers, a discharge passageway in the first pressure chamber, a pair of reciprocating valves connected to said diaphragm, one of said reciprocating valves being operable between open and closed positions with respect to the valve seat in said valve housing for controlling the flow of fluid therethrough, said other reciprocating valve being engageable with the discharge passageway in said upper chamber for terminating the initial opening step of said first named reciprocating valve when it has reached a partially open position, a restrictably adjustable discharge passageway in the first chamber for controlling the second step of the opening movement of said first named valve, and valve means adapted to control flow through both discharge passageways and to balance and unbalance the pressures in the said chambers by additionally controlling flow through the passage between said chambers.

20. In a valve control mechanism, a valve housing having an inlet and an outlet with a valve seat therebetween, a valve in said housing positioned to open and close on said seat, a sleeve adjustably positioned in said housing, a stem extending from said valve and through said sleeve, said valve stem having a passageway therein extening from one end thereof to a point intermediate the ends thereof, motor means operably connected to said stem, said point on said stem being in said inlet and said end being in said motor means, an adjustment means for varying the distance between said end of the sleeve and the passageway terminal at the intermediate point of the stem whereby operation of said motor and movement of said stem and said valve may be controlled.

21. In a fluid control valve mechanism, a valve housing having a passage therethrough and a valve seat therein, a pressure motor having a movable wall, means for supplying fluid under pressure to said motor, a main valve operatively connected to said wall and movable with respect to said valve seat between a closed and a full open position through a partially open position, means controlling the pressure on opposite sides of said wall to move said main valve from closed to a said partially open position at a selected rate and from said partially open position to full open position at a different rate, and additional means for balancing the pressure on opposed sides of said wall to move said main valve to closed position.

GEORGE H. BERKHOLDER.

REFERENCES CITED

The following references are of record in the file of this patent:

UNITED STATES PATENTS

| Number | Name | Date |
|---|---|---|
| 610,479 | Ewart | Sept. 6, 1898 |
| 1,017,170 | Rait | Feb. 13, 1912 |
| 1,190,681 | Spitzer | July 11, 1916 |
| 1,536,424 | Cowley | May 5, 1925 |
| 1,600,774 | Pasman | Sept. 21, 1926 |
| 1,851,062 | Protzer | Mar. 29, 1932 |
| 1,861,742 | Hand | June 7, 1932 |
| 1,922,874 | Tymstra | Aug. 15, 1933 |
| 1,971,048 | Parsons | Aug. 21, 1934 |
| 2,125,601 | Busch | Aug. 2, 1938 |
| 2,142,950 | Loeffler | Jan. 3, 1939 |
| 2,158,787 | Lorenz | May 16, 1939 |
| 2,273,127 | McGoldrick | Feb. 17, 1942 |
| 2,317,639 | Ray | Apr. 27, 1943 |

FOREIGN PATENTS

| Number | Country | Date |
|---|---|---|
| 483,835 | Great Britain | 1938 |

Certificate of Correction

Patent No. 2,476,400                                              July 19, 1949

GEORGE H. BERKHOLDER

It is hereby certified that errors appear in the printed specification of the above numbered patent requiring correction as follows:

Column 11, lines 73 and 74, strike out "a passageway between said inlet and said motor" and insert the same in line 73, same column, before the word "means"; column 12, lines 48 and 49, strike out "with respect to said seat" and insert the same in line 48, same column, after the word "valve", first occurrence, and before the comma;

and that the said Letters Patent should be read with these corrections therein that the same may conform to the record of the case in the Patent Office.

Signed and sealed this 21st day of March, A. D. 1950.

[SEAL]

THOMAS F. MURPHY,
*Assistant Commissioner of Patents.*